US010002377B1

(12) United States Patent
Johnson et al.

(10) Patent No.: US 10,002,377 B1
(45) Date of Patent: Jun. 19, 2018

(54) INFRARED DRIVEN ITEM RECOMMENDATIONS

(71) Applicant: Amazon Technologies, Inc., Seattle, WA (US)

(72) Inventors: Joseph Edwin Johnson, Seattle, WA (US); Benjamin Schwartz, Seattle, WA (US); Shiblee Imtiaz Hasan, Seattle, WA (US); Nathan Eugene Masters, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 770 days.

(21) Appl. No.: 14/579,720

(22) Filed: Dec. 22, 2014

(51) Int. Cl.
  *G06Q 30/00* (2012.01)
  *G06Q 30/06* (2012.01)
  *G06T 7/00* (2017.01)
  *G06T 7/60* (2017.01)

(52) U.S. Cl.
  CPC ..... *G06Q 30/0631* (2013.01); *G06Q 30/0621* (2013.01); *G06T 7/0044* (2013.01); *G06T 7/0075* (2013.01); *G06T 7/602* (2013.01); *G06T 2207/10012* (2013.01); *G06T 2207/10028* (2013.01); *G06T 2207/10048* (2013.01); *G06T 2207/30196* (2013.01)

(58) Field of Classification Search
  CPC .......................................... G06Q 30/06–30/08
  USPC ................................................ 705/26.1–27.2
  See application file for complete search history.

(56) References Cited

U.S. PATENT DOCUMENTS

| | | | | |
|---|---|---|---|---|
| 6,633,664 B1* | 10/2003 | Minamida | ............... | G06K 9/209 345/419 |
| 9,734,634 B1* | 8/2017 | Mott | ..................... | G06T 19/006 |
| 2009/0234489 A1* | 9/2009 | Healy | .................... | G06O 30/02 700/130 |
| 2010/0185529 A1* | 7/2010 | Chesnut | ................. | G06Q 30/00 705/26.1 |
| 2011/0298897 A1* | 12/2011 | Sareen | .................... | G06N 3/006 348/47 |
| 2012/0299912 A1* | 11/2012 | Kapur | ..................... | G06F 3/017 345/419 |
| 2013/0083065 A1* | 4/2013 | Schulze | ................ | G06T 19/006 345/633 |

OTHER PUBLICATIONS

"Ashford.com Announces Strong Revenue and Customer Growth With Far Lower Than Expected Operating Losses" (PR Newswire, Jul. 27, 2000) https://dialog.proquest.com/professional/docview/671768295?accountid=142257 (Year: 2000).*

* cited by examiner

*Primary Examiner* — Ethan D Civan
(74) *Attorney, Agent, or Firm* — Kilpatrick Townsend & Stockton LLP

(57) ABSTRACT

Techniques for detecting dimensions of an object from a three dimensional (3D) image may be provided. Dimensions of an object may be determined based upon a received 3D image and calibration information for calibrating a dimension related to the 3D image. The calibration information may be utilized for calibrating aspect ratios of the 3D image. In an example, a recommended item may be identified and presented to the user based on the determined dimensions of the object.

20 Claims, 8 Drawing Sheets

US 10,002,377 B1

INFRARED DRIVEN ITEM RECOMMENDATIONS

BACKGROUND

Current network technologies allow for a variety of interactions between business institutions and users. For example, a user may purchase groceries or pizza for delivery to his home via websites hosted by respective businesses that offer these goods. A user may also browse an electronic marketplace for a variety of items (e.g., goods and/or services), learning details about the items, cost of ordering the items, and an expected delivery date. In a face-to-face commerce environment, a user can visit an item provider's brick-and-mortar store to purchase an item. The item provider can offer the item for the user to handle and view in-person before a purchase, so that if a user has questions about the weight of the item or actual color of the item, the user can feel and see the item to make a determination. The item provider may also answer the user's questions and help the user find the right item to purchase. However, a user cannot currently perform these activities when ordering an item from a network site. This may result in the user purchasing an item that does not fit or feel right once the item is in his or her possession. Thus, the user may waste time and money shopping for items on a network site that are either incorrect or are not personalized to her or his taste.

BRIEF DESCRIPTION OF THE DRAWINGS

Various embodiments in accordance with the present disclosure will be described with reference to the drawings, in which.

DETAILED DESCRIPTION

Figure 1:
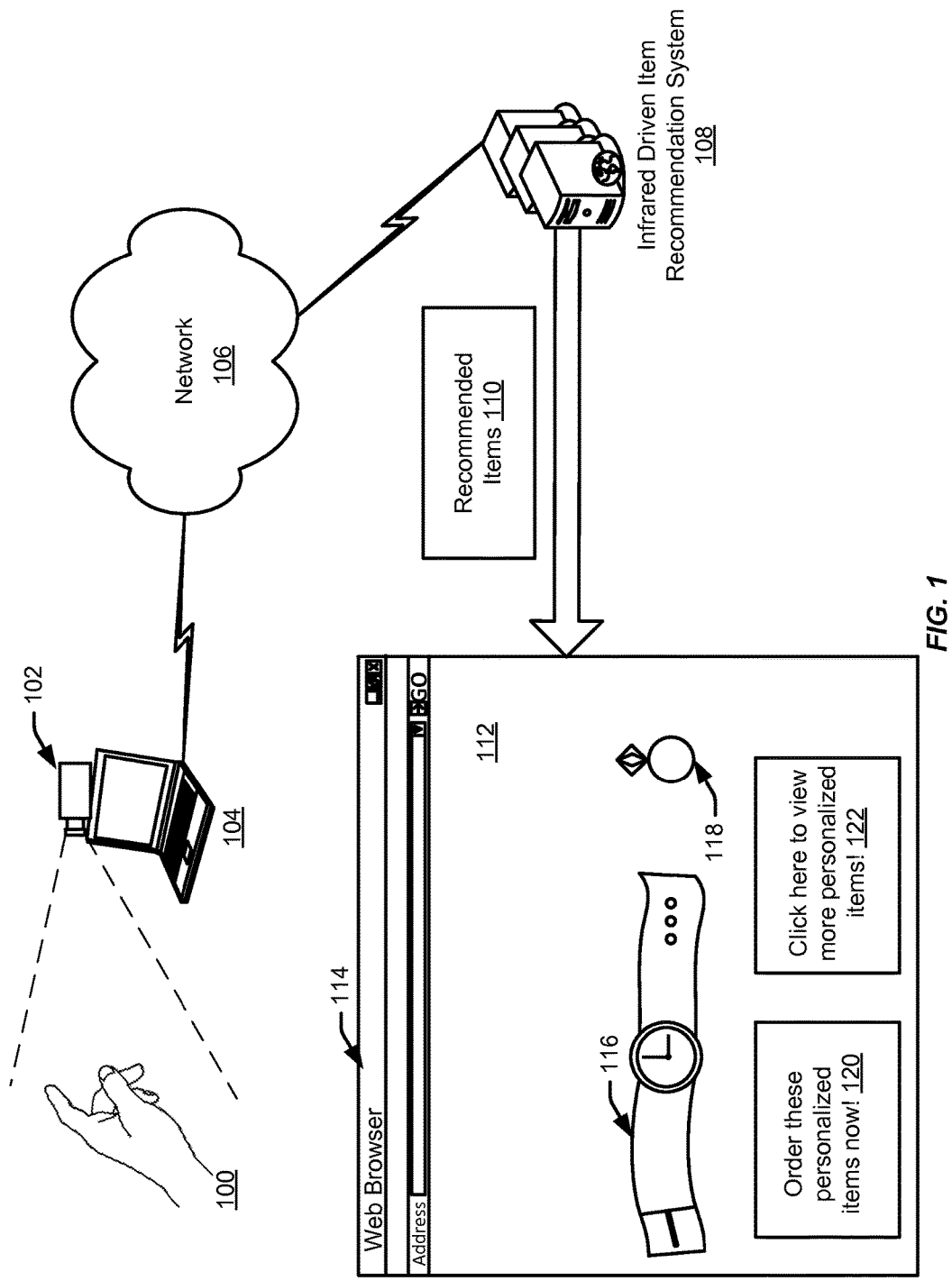
FIG. 1 is a pictorial diagram depicting operation of an illustrative infrared driven item recommendation system in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems, methods, and non-transitory computer-readable media for implementing an infrared driven item recommendation feature that provides a more personalized shopping experience for a user. In accordance with at least one embodiment, an infrared device(s) may scan or capture a portion of a user, such as a hand of the user. The scanned or captured data can used to generate a three dimensional (3D) image of the portion and depth map information for the image. In accordance with at least one embodiment, depth map information includes any suitable information that indicates relative distances and positions of surfaces of objects from a viewpoint. In embodiments described herein, range imaging techniques including stereo triangulation using stereoscopic camera(s) and structured light using an infrared light source may be utilized to generate a 3D image of an object and generate depth map information. Calibration information, including distance from the infrared device to the hand, may be captured by the infrared device or inferred from a point of reference. In an embodiment, calibration information includes any suitable information for calibrating dimensions of an object included in the 3D image. Calibration information may indicate the distance from a 3D imaging device to an object and can include utilizing a laser reference point, dimension information associated with a known object such as a quarter, environmental cues such as other objects in the background of the 3D image. A computing system implementing the infrared driven item recommendation feature may utilize the depth map information and the calibration information to infer or determine dimensions of the hand, such as the length and circumference of the user's fingers. In embodiments, the determined dimensions of the portion of the user may be utilized to provide personalized item recommendations. For example, the determined dimensions for the hand may be used to identify items for purchase that are physically compatible with the user, such as particular gloves that would comfortably fit the user's hand, or a watch that would fit the user's wrist.

In some embodiments, the identified dimensions of the portion of the user may be checked or compared to a library of dimensions of similar portions of other users. The library of dimensions may include aggregated dimension information from a plurality of users or average dimension information from the plurality of users that can be utilized by the computing system to check the accuracy of the identified dimensions for the portion of the user captured in the 3D image. The identified dimensions may be updated or adjusted based on the library of dimensions of similar portions of other users. In an embodiment, the average dimension information may also be utilized to adjust the identified dimensions. For example, if the identified dimensions are a certain interval from the average dimensions, such as three standard deviations (assuming a Gaussian distribution of the average dimension information), instructions may be generated and provided to the user for rescanning or recapturing a 3D image of the portion of the user or the object.

In accordance with at least one embodiment, the computing system may provide a recommended item to the user in response to a user scanning an object, such as a screw or handle, with an infrared device. The system may receive a 3D image of the object to generate depth map information and calibration information about the object and determine dimensions of the object such as the length, diameter, and circumference therefrom. In an embodiment, the system may maintain a library of dimensions for a plurality of items offered by an associated electronic marketplace. The system may provide a recommended item based at least in part on the determined dimensions of the object and the maintained library of dimensions for the plurality of objects. For example, if a user provides a screw for the infrared device to scan, the system may provide, via a GUI, an identified screw offered by the associated electronic marketplace that is of similar dimensions as the scanned screw. The user may be provided, based on the dimensions of the object scanned, with one or more items that the user can select to order for delivery. In some embodiments, the library of dimensions for the plurality of objects may be utilized to check the determined dimensions of the scanned object and adjust the dimensions of the scanned object. The library of dimensions for the plurality of objects may also be utilized as a data point in determining the dimensions of the scanned object thereby adjusting the dimensions of the scanned object by utilizing suitable statistical techniques (such as adjusting the determined dimensions to be within a certain standard deviation from an average dimension for the object).

FIG. 1 is an illustrative flow that depicts an example of an infrared driven item recommendation system in accordance with at least one embodiment. FIG. 1 includes a portion of a user 100 interacting with an infrared device 102 associated with a user computing device 104. In FIG. 1, the portion of the user 100 is a hand of the user. In accordance with at least one embodiment, the infrared device 102 may capture or scan the portion of the user 100 to generate a 3D image of the portion of the user 100. In accordance with at least one embodiment, range imaging techniques including stereo triangulation using stereoscopic cameras, structured light using an infrared light source, or any suitable light source, and interferometry may be utilized to generate the 3D image. The infrared device 102 may be any suitable 3D imaging device that can implement the range imaging techniques described herein. The 3D image may be provided via the user computer device 104 and one or more networks 106 to an infrared driven item recommendation system 108. In embodiments, the infrared driven item recommendation system may be associated with an electronic marketplace (not pictured) for providing recommended items to the user. As used herein, the term "item," in addition to having its ordinary meaning, is used interchangeably to refer to an item itself (e.g., a particular product, application, or the like) and to its description or representation in a computer system. As will be apparent from the context in which it is used, the term is also sometimes used herein to refer only to the item itself or only to its representation in the computer system.

In an embodiment, the infrared device 102 may provide calibration information to the infrared driven item recommendation system 108. In embodiments, the calibration information may be captured by the infrared device 102 in response to the user following provided instructions to place his or her hand a certain distance from the infrared device or by instructing the user to hold a reference object, such as a quarter in his or her hand during the scan/capture process. In some embodiments, the infrared device 102 or user computer device 104 may be configured to determine the calibration information based on a distance measurement reference such as a laser pointer directed at the portion of the user 100. The distance measurement reference may aid the infrared device 102 in determining dimensions of the object by comparing the known dimension of the distance measurement reference to the object. In addition, the size of the distance measurement reference can be used to calculate a distance between the object and the infrared device by triangulating the length with known measurements on the distance measurement reference. Based upon the length determination, the infrared device may instruct to increase or decrease the resolution of the infrared device to make an appropriately detailed 3D scan of the object. In accordance with at least one embodiment, the infrared driven item recommendation system 108 may use the received 3D image to generate depth map information for the portion of the user 100 interacting with the infrared device 102. The infrared driven item recommendation system 108 may utilize the generated depth map information and the received calibration information to determine the size or dimensions of the portion of the user 100 included in the 3D image. For example, a ring size can be determined for each finger of the user's hand included in the portion of the user 100.

In an embodiment, the determined dimensions of the portion of the user 100 may be utilized to generate one or more recommended items 110 that correspond to the determined dimensions of the portion of the user 100. For example, the infrared driven item recommendation system 108 may perform image recognition on the received 3D image to determine that the portion of the user 100 corresponds to a hand. Further, the infrared driven item recommendation system 108 may use the determined dimensions to generate one or more recommended items 110 that are appropriate for a hand and for the determined dimensions of the hand, such as a glove or watch. In an embodiment, the infrared driven item recommendation system 108 may provide or present the recommended items 110 to the user via a GUI 112 for order and delivery. In FIG. 1, the recommended items 110 are provided to the user via a network page 114 and include a watch 116 and ring 118 that correspond to the determined dimensions of the portion of the user 100. The provided GUI may be presented in the same user computer device 104 associated with the infrared device 102 or via another user computer device (not pictured). The GUI may be configured to allow the user to order the recommended items 120 or view more personalized items 122 that are compatible with the determined dimensions. Thus, a user may be provided with one or more items that are compatible with the determined dimensions for a portion of the user creating a more personalized shopping experience that is more efficient by reducing the time required to find items that will comfortably fit the user.

Figure 2:
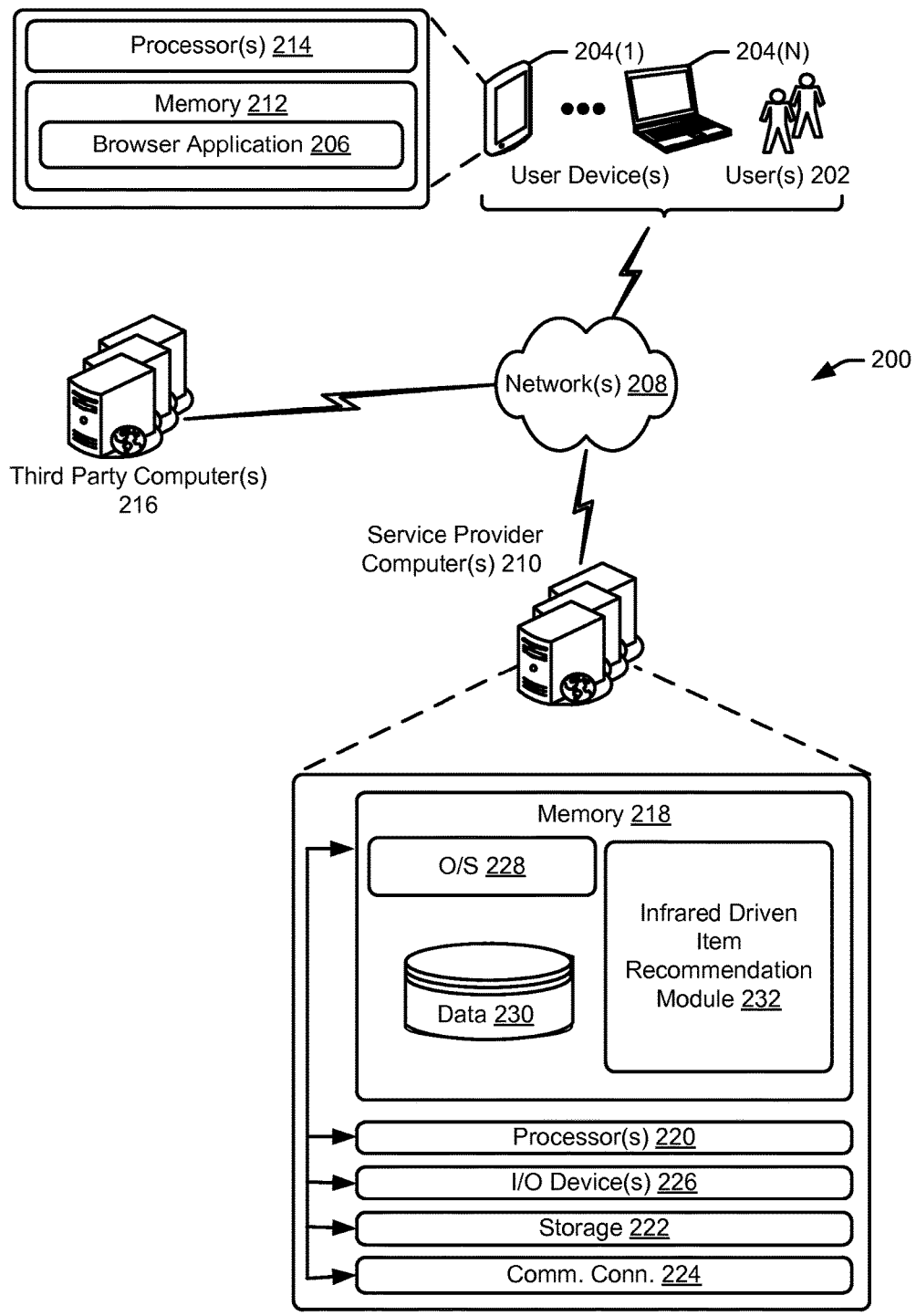
FIG. 2 is a block diagram depicting an example networked architecture for implementing an illustrative infrared driven item recommendation system as described herein that includes one or more service provider computers and/or a user device connected via one or more networks in accordance with at least one embodiment.

FIG. 2 is a block diagram depicting an example networked architecture for implementing an infrared driven item recommendation system as described herein that includes one or more service provider computers and/or a user device connected via one or more networks in accordance with at least one embodiment. In architecture 200, one or more users 202 (e.g., the user 100) may utilize user computing devices 204(1)-(N) (collectively, user devices 204 (e.g., user computing devices 104)) to access a browser application 206 (e.g., a web browser) or a user interface (UI) accessible through the browser application 206, via one or more networks 208 (e.g., the one or more networks 106) to receive a notification or message provided in part by the message planning feature as described herein. The "browser application" 206 can be any browser control or native application that can access and display a network page or other information. In some embodiments, the user computing device 204 may be associated with an infrared device to provide a 3D image or scan of an object or portion of a user. In some aspects, the browser application 206 may display an interactive UI for providing the determined dimensions of the object or portion of the user, recommended items that are compatible with the determined dimensions, and allow the user to update the determined dimensions as described herein.

The architecture 200 may also include, one or more service provider computers 210 that may, in some examples, provide computing resources such as, but not limited to, client entities, low latency data storage, durable data storage, data access, management, virtualization, hosted computing environment or "cloud-based" solutions, electronic content performance management, etc. The one or more service provider computers 210 may also be operable to provide site hosting, computer application development, and/or implementation platforms, combinations of the foregoing, or the like to the one or more users 202.

In one illustrative configuration, the user computing devices 204 may include at least one memory 212 and one or more processing units or processor(s) 214. The processor(s) 214 may be implemented as appropriate in hardware, computer-executable instructions, firmware, or combinations thereof. Computer-executable instruction or firmware implementations of the processor(s) 214 may include computer-executable or machine-executable instructions written in any suitable programming language to perform the various functions described herein. The user devices 204 may also include geo-location devices (e.g., a global positioning system (GPS) device or the like) for providing and/or recording geographic location information associated with the user devices 204. The memory 212 may store program instructions that are loadable and executable on the processor(s) 214, as well as data generated during the execution of these programs. Depending on the configuration and type of user device 204, the memory 212 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 212 may include multiple different types of memory, such as static random access memory (SRAM), dynamic random access memory (DRAM), or ROM.

Turning to the components of the memory 212 in more detail, the memory 212 may include an operating system and one or more application programs or services for implementing the features disclosed herein including providing determined dimensions of an object/portion of the user or providing recommended items that are compatible with the determined dimensions to the user 202 via the browser application 206, dedicated applications (e.g., smart phone applications, tablet applications, etc.), or through capabilities inherit to a device (e.g., user interfaces or touch input interfaces). Additionally, the memory 212 may store access credentials and/or other user information such as, but not limited to, user IDs, passwords, and/or other user information. In some examples, the user information may include information for authenticating an account such as, but not limited to, a device ID, a cookie, an IP address, a location, or the like. In addition, the user information may include a user 202 provided response to a security question or a geographic location obtained by the user device 204.

In some examples, the networks 208 may include any one or a combination of many different types of networks, such as cable networks, the Internet, wireless networks, cellular networks and other private and/or public networks. While the illustrated example represents the users 202 communicating with the service provider computers 210 and third party computers 216 over the networks 208, the described techniques may equally apply in instances where the users 202 interact with the one or more service provider computers 210 and/or the third party computers 216 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

As described briefly above, the browser application 206 may allow the users 202 to interact with a provided recommendation to order an item for delivery or to update the determined dimensions provided by the one or more service provider computers 210 for executing the infrared driven item recommendation feature as describe herein. The browser application 206 may be capable of handling requests from many users 202 and serving, in response, various user interfaces that can be rendered at the user devices 204 such as, but not limited to, a network site or network page. The browser application 206 can interact with any type of network site that supports user interaction, including social networking sites, electronic retailers, informational sites, blog sites, search engine sites, news and entertainment sites, electronic marketplaces, and so forth. The described techniques can similarly be implemented outside of the browser application 206, such as with other applications running on the user device 204.

The one or more service provider computers 210 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 210 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 210 may be in communication with the user device 204 via the networks 208, or via other network connections. The one or more service provider computers 210 may include one or more servers, perhaps arranged in a cluster or as individual servers not associated with one another. The one or more service provider computers 210 may be in communication with one or more third party computers 216 via networks 208. The one or more service provider computers 210 may obtain and provide data to third party computers 216 via networks 208 in accordance with embodiments described herein. The one or more third party computers 216 may be provided determined dimensions for updating user preferences associated with third party services. For example, the infrared driven item recommendation feature implemented by the one or more service provider computers 210 may provide the determined dimensions of a portion of a user to a third party service via a third party computer for use in shopping with the third party service.

In one illustrative configuration, the one or more service provider computers 210 may include at least one memory 218 and one or more processing units or processors(s) 220.

The processor(s) 220 may be implemented as appropriate in hardware, computer-executable instructions, firmware, or combinations thereof. Computer-executable instruction or firmware implementations of the processor(s) 220 may include computer-executable or machine-executable instructions written in any suitable programming language to perform the various functions described when executed by a hardware computing device, such as a processor. The memory 218 may store program instructions that are loadable and executable on the processor(s) 220, as well as data generated during the execution of these programs. Depending on the configuration and type of the one or more service provider computers 210, the memory 218 may be volatile (such as RAM) and/or non-volatile (such as ROM, flash memory, etc.). The one or more service provider computers 210 or servers may also include additional storage 222, which may include removable storage and/or non-removable storage. The additional storage 222 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 218 may include multiple different types of memory, such as SRAM, DRAM, or ROM.

The memory 218, the additional storage 222, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 218 and the additional storage 222 are all examples of non-transitory computer storage media. Additional types of non-transitory computer storage media that may be present in the one or more service provider computers 210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the one or more service provider computers 210. Combinations of any of the above should also be included within the scope of non-transitory computer-readable media.

The one or more service provider computers 210 may also contain communication connection interface(s) 224 that allow the one or more service provider computers 210 to communicate with a data store, another computing device or server, user terminals and/or other devices on the networks 208. The one or more service provider computers 210 may also include I/O device(s) 226, such as a keyboard, a mouse, a pen, a voice input device, a touch input device, a display, speakers, a printer, etc.

Turning to the contents of the memory 218 in more detail and as will be described in further detail in FIG. 3, the memory 218 may include an operating system 228, one or more data stores 230, and/or one or more application programs or services for implementing the features disclosed herein including an infrared driven item recommendation module 232. In accordance with at least one embodiment, the infrared driven item recommendation module 232 may be configured to receive a 3D image of a portion of a user and calibration information, generate depth map information for the portion of the image using the 3D image, determine dimensions of the portion of the user based on the depth map information and the calibration information, and provide one or more recommended items to the user that have and are related to the determined dimensions of the portion of the user.

Figure 3:
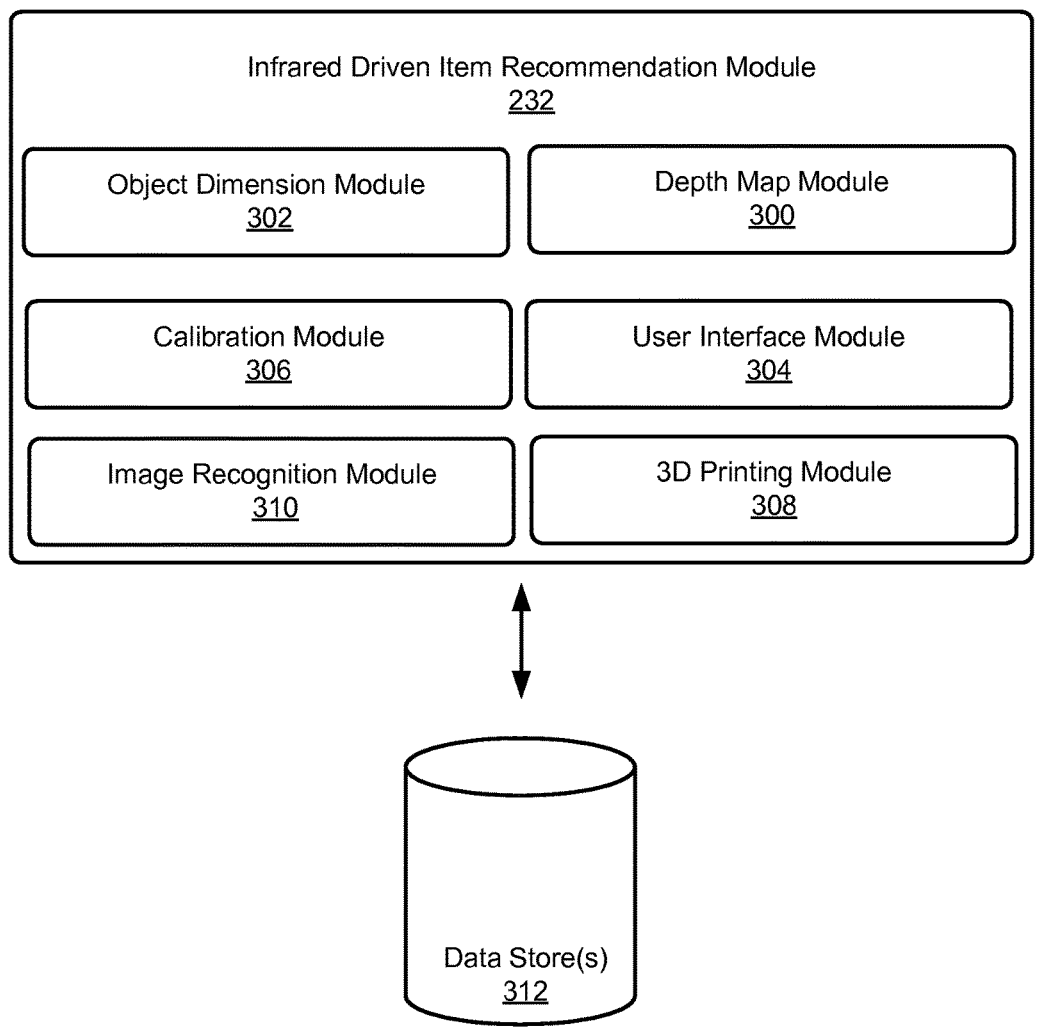
FIG. 3 is a block diagram depicting an illustrative infrared driven item recommendation module and associated data stores in accordance with at least one embodiment.

FIG. 3 is a block diagram depicting an illustrative infrared driven item recommendation module and associated data stores in accordance with at least one embodiment. It should be noted that while multiple modules are described in the example infrared driven item recommendation module 232, the processes and methods described herein can be performed by more or less modules within memory such as memory 218 described above. In addition, while the modules 300-310 included in infrared driven item recommendation module 232 are displayed and described as distinct modules, embodiments they may be included within one another to further facilitate methods and systems described herein. In accordance with at least one embodiment, the infrared driven item recommendation module 232 may include a depth map module 300, an object dimension module 302, a user interface module 304, a calibration module 306, a 3D printing module 308, and an image recognition module 310 in communication with one or more data stores 312 (which is an example of the one or more data stores 230 from FIG. 2).

In accordance with at least one embodiment, the infrared driven item recommendation module 232 may be configured for generating one or more recommended items for a user based on determined dimensions of an object. The object can be, as examples, a portion of a user or an item. The recommended item can be presented to the user via a GUI, such as a GUI presented from an electronic marketplace. The infrared driven item recommendation module 232 may obtain the determined dimensions of the object from the object dimension module 302. The one or more recommended items may be provided to the user interface module 304 for presentation to the user as described herein. In an embodiment, the infrared driven item recommendation module 232 may utilize the determined dimensions of an object and data provided by the image recognition module 310 to generate the one or more recommended items. For example, the image recognition module 310 may be configured to determine what the object is based on image recognition techniques and comparison of the object to a maintained library of 3D images.

The infrared driven item recommendation module 232 may maintain the library of 3D images for image recognition techniques in the one or more data stores 312. In some embodiments, the infrared driven item recommendation module 232 may be configured for checking the accuracy of the determined dimensions of the object by utilizing a maintained set of aggregate dimensions for other objects, including a portion of a plurality of users, and adjusting the determined dimensions based on the aggregate dimensions for other objects. For example, the infrared driven item recommendation module 232 may maintain a set of determined dimensions for a plurality of hands belonging to a plurality of users utilizing the system. As used herein, a portion of a user may include any anatomical body part associated with a user including a finger, thumb, hand, arm, foot, neck, wrist, etc. The infrared driven item recommendation module 232 may remove outlier determined dimensions for hands based on a comparison to the set of dimensions for the other hands in the dataset. The determined dimensions can be averaged to determine an average determined dimension and average aspect ratios between different portions of the hand. For example, a user having fingers of length L and a palm of width P may typically have a ring size of X. Other ratios and dimension information can be maintained, and accessed as necessary to make an estimate of a dimension of a user based upon a comparison of scanned information of the user and comparison of measurable dimensions of the object to objects maintained as the determined dimensions. The average determined dimension information maintained by the system may be subject to standard statistical analysis to remove outlier dimension information data points. Alternatively, the determined dimensions of the user's hand can be compared to a hand in the dataset having similar dimensions and a known ring size, and an assumption can be made that the two hands have the same ring size. The infrared driven item recommendation module 232 may maintain the set of determined dimensions for other objects in the one or more data stores 312.

The infrared driven item recommendation module 232 may be configured for maintaining user account preferences that are unique for each particular user associated with the systems. The user account preferences can include the determined dimensions for each portion of a user or for items provided by the user and be maintained in the one or more data stores. The infrared driven item recommendation module 232 may utilize the user account preferences to provide personalized information to the user interface module 304. For example, the personalized information may include a notification that a currently viewed item by the user is unavailable in a size that would comfortably fit them thus creating a more efficient shopping experience. The maintained user preferences may also be used in subsequent item recommendations to aid the user in finding items that are similar to previously identified items and with dimensions that are personalized to them.

In accordance with at least one embodiment, the depth map module 300 may be configured for receiving the 3D image of an object and generating a depth map of the object. The depth map module 300 may utilize 3D images that are received as a result of stereoscopic cameras, a 3D image generated from a time lapse of images from a single point or from multiple points, or any other suitable technique for generating 3D images including using infrared devices. In an embodiment, the depth map module 300 may generate the depth map for an object from multiple 3D image scans of the object thus creating an average depth map that encompasses many angles. The depth map module 300 may be configured for generating and providing to the user interface module 304 a notification regarding an unsuccessful scan of the object by an infrared device or requesting additional images if a depth map is incapable of being generated by the provided 3D image(s). Functions of the depth map module 300 may be included on a user device 204, and a depth map may be provided to infrared driven item recommendation system 108.

In accordance with at least one embodiment, the object dimension module 302 may be configured for determining the dimensions of an object included in the depth map or that has been scanned/captured by the infrared device as described herein. In an embodiment, the determined object dimensions can include any numerical measurement capable of being derived from the depth map of the object and the calibration information provided by the calibration module 306. The determined object dimensions may include size such as length, width, height, diameter, volume, and circumference. The determined object dimensions may be communicated to the infrared driven item recommendation module 232 for generating a recommendation that includes one or more items that are compatible with the determined dimensions and for updating the user preferences for a particular user associated with the object. In accordance with at least one embodiment, the object dimension module 302 may be configured to utilize the depth map from the 3D image, references included in the 3D image, and a computer vision algorithm to determine the dimensions of the object. The computer vision algorithm may triangulate the dimensions of the object in the depth map by using the distance of known objects from the infrared device focal point compared to the distance of the object in the 3D image.

In accordance with at least one embodiment, the user interface module 304 may be configured for providing/presenting recommended items generated by the infrared driven item recommendation module 232 that are compatible with the determined dimensions for a scanned object, including a portion of a user such as a hand. In an embodiment, the user interface module 304 may be configured to receive input from the user via the user interface for adjusting the determined dimensions. For example, although the infrared driven item recommendation module 232 may have included a size 8 ring, derived from the dimensions determined by the object dimension module 302, the user may wish for a tighter fitting ring and seek to decrease the size of the ring included in the recommendation. Thus, the user may interact with the user interface to adjust any presented dimensions of objects via the user interface generated by the user interface module 304. In embodiments, the user interface module 304 may be configured for allowing the user to order any item included in the recommended items for delivery as seen in FIG. 1.

The calibration module 306 may utilize known dimensions of an object similar to the scanned object 100 to generate and provide calibration instructions to the user to capture an accurate 3D image of the scanned object for accurate dimension calculation by the object dimension module 302. The image recognition module 310 may utilize information received from the 3D imaging device, such as an initial quick scan, to identify and provide the known dimensions of a similar object to the calibration module 306 for generating the calibration instructions. The calibration instructions may be presented as a visual guide in a user interface that includes instructions for the user indicating how to present or provide the object to the imaging device/infrared device for accurate scanning/capture of the object. This process can involve user interaction. To this end, the user interface module 304 may be configured to provide calibration instructions to the user as provided by the calibration module 306. For example, a user interface may be provided on the user computer device 104. The user interface may provide a visual guide with text/audio instructing the user to hold the object a certain distance or at certain angles to the infrared device for calibration or determination of distance of the object from the infrared device. In an embodiment, the user interface module 304 may be configured for providing an augmented reality presentation of the object interacting with an item included in the recommended items. For example, if the user provided her hand for determining dimensions and one of the items included in the recommendation were a ring, the user interface module 304 may provide an augmented reality presentation that includes the user's hand with a wire frame of the ring overlaid on the representation of the hand. The augmented reality presentation may aid the user in verifying the determined dimensions of the object scanned and the fit an appropriateness of an item included in the recommended one or more items. The user may also interact with the UI for adjusting the dimensions of the item displayed on the object for finer granularity, if needed. This may aid the user in determining the thresholds or boundaries associated with particular items with reference to the scanned object (finding the largest ring size that would still fit or the smallest ring size that would still be bearable for example). In an embodiment, a 3D model of the object, including the portion of a user, may be generated along with a generated 3D model of the recommended item, and presented to the user via the UI. The 3D models may be generated by the user interface module 304 utilizing information from the calibration module 306, the object dimension module 302, and the infrared driven item recommendation module 232. In an embodiment, the user computing device may be configured to capture and stream video data of the presented object or portion of the user that is provided by the user to the infrared device. The user interface module 304 may be configured to utilize the streamed video data to overlay the generated 3D models of the recommended item and/or the scanned object interacting with the streamed video data to provide a real time 3D model interface experience to the user.

In accordance with at least one embodiment, the calibration module 306 may be configured for determining the distance of an object from the infrared device 102. As briefly described above, the calibration module 306 may generate and provide calibration instructions to the user for properly scanning or capturing a 3D image of the object. In an embodiment, the calibration module 306 may be configured for utilizing information obtained by the infrared device itself, such as a laser point of reference, to determine the distance of the object from the infrared device. In some embodiments, the calibration module 306 may be configured for utilizing a reference point or object such as a quarter included in the 3D image for determining the distance of the scanned object. In accordance with at least one embodiment, the calibration module 306 may infer the distance of the scanned object by utilizing computer vision techniques using context cues in the background such as the user's head and dimensions of the infrared device capturing the 3D image. In an embodiment, the user may be provided with a tracking device that can be attached to the object to be scanned. The infrared device may interact with the tracking device and provide the data captured between the two points to the calibration module 306 to determine the distance of the object from the infrared device. In embodiments, the calibration module 306 may be configured to determine aspect ratios of the identified object included in the 3D image compared to other contextual images included in the captured 3D image such as the hand of the user compared to a quarter or other object that can be utilized for calculating known aspect ratios.

In accordance with at least one embodiment, the 3D printing module 308 may be configured for providing 3D manufacturing instructions to a 3D manufacturing apparatus for manufacturing an item included in the item recommendations according to the determined dimensions. The 3D manufacturing instructions may also be provided to a 3D manufacturing entity that utilizes 3D manufacturing apparatuses. The 3D manufacturing entity may be a third party. The 3D manufacturing instructions may indicate that the 3D manufacturing apparatus use low cost or efficient materials for manufacturing the user selected item. In an embodiment, the 3D manufacturing instructions may merely indicate utilizing a different manufacturing material than what is normally associated with the user selected item. For example, if the recommended item includes an engagement ring, the 3D manufacturing instructions may indicate the use of low cost metals such as copper as opposed to silver or gold. As briefly described above, the user may provide input for adjusting the dimensions of a user selected item which in turn will modify the 3D manufacturing instructions. The 3D manufactured item may aid the user in determining whether to purchase a particular item, as the user is able to determine the look and feel of an item that adheres to the determined dimensions.

In accordance with at least one embodiment, the image recognition module 310 may be configured for identifying the object included in the 3D image. In an embodiment, the image recognition module 310 may utilize image recognition techniques for identifying the object included in the 3D image. In some embodiments, the image recognition module 310 may compare the object included in the 3D image to other 3D images of objects that are included in a maintained library of images as described above. The image recognition module 310 may perform the same comparison utilizing depth maps of objects scanned and maintained by the system. The identifying information of the object may be provided to the infrared driven item recommendation module 232 for use in generating one or more recommended items based on the scan of the object or 3D image. In an embodiment, image recognition may include edge detection techniques that utilize first or second derivatives, equivalently, to detect large changes in pixel averages/values over a local region which can be used to determine when an edge is likely to exist. Edges of images can be thought of as outlines in some cases or patterns in others. Edge detection can be utilized to help identify the object included in the 3D image or for recovering 3D information from a 2D image of the object. In embodiments, template matching may also be included in image recognition. Template matching may use patterns garnered from edge detection for determining what the object is utilizing the outline of the image or the pattern of the image. Template matching may include utilizing samples of known reference objects at multiple translations/rotations/scales and then compared to templates using convolution or related cross-correlation operators to check for overall match. Template matching may be utilized with other techniques such as edge detection to re-enforce other image recognition techniques. In some embodiments, scale invariant feature transform or simultaneous localization and mapping techniques may be performed in conjunction with the image recognition described herein. Background segmentation may be performed on the 3D image or image captured by the imaging device by applying histograms to the image. The histograms may be utilized as a pre-processing technique for performing routine background segmentation, such as separating a user's hand from the background, such as a ceiling or wall behind the user's hand.

Figure 4:
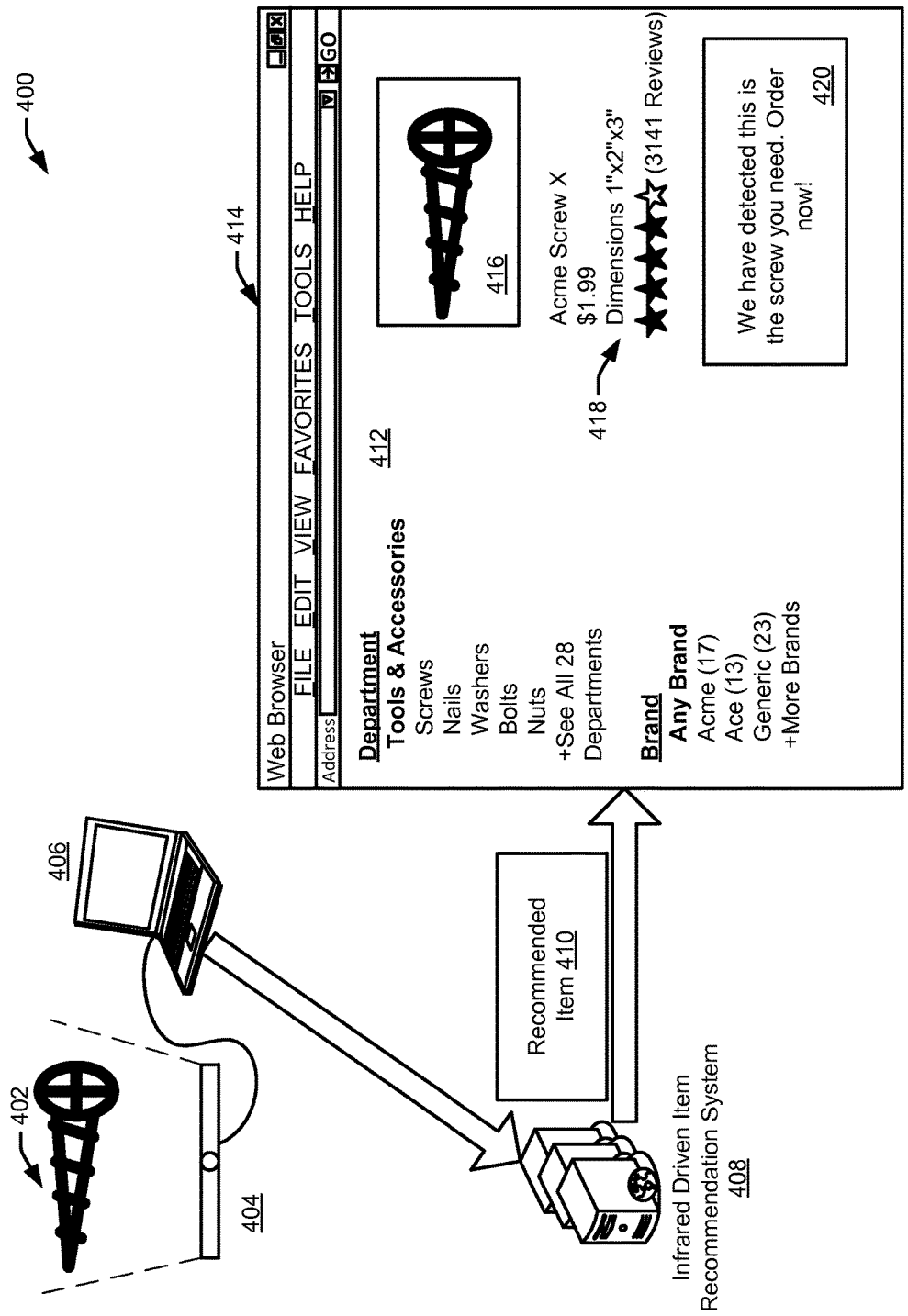
FIG. 4 is a pictorial diagram depicting operation of an illustrative infrared driven item recommendation system in accordance with at least one embodiment.

FIG. 4 is a block diagram depicting operation of an illustrative infrared driven item recommendation system in accordance with at least one embodiment. The illustrative flow 400 of FIG. 4 includes an object 402 being scanned by an infrared device 404 associated with a user computing device 406 (which may be an example of user computing device 204 from FIG. 2). The object 402 illustrated in FIG. 4 is a screw. As briefly discussed above, embodiments described herein include determining dimensions of an object and generating a recommendation for an identical or similar item for order and delivery to a user. The user computing device 406 may provide the 3D image of the object, as captured by the infrared device 404, to an infrared driven item recommendation system 408. In an embodiment, the infrared driven item recommendation system 408 may utilize the received 3D image to generate depth map information for the object 402. The infrared driven item recommendation system 408 may determine dimensions for the object 402 based on the generated depth map information and calibration information received from the infrared device 404.

In accordance with at least one embodiment, the determined dimensions for object 402 may be utilized by the infrared driven item recommendation system 408 to generate a recommended item 410 to be provided to the user who scanned the object 402. As described above, the infrared driven item recommendation module 232 may generate the item recommendation to be provided to the user via a user interface, such as user interface 412. The user interface 412 in FIG. 4 is provided to the user via a network page 414 which may be an example of browser application 206 from FIG. 2. The infrared driven item recommendation system 408 may also utilize image recognition techniques to identify the object included in the 3D image provided by user computing device 406. The image recognition techniques may include using a library of 3D images or depth map information for a plurality of images associated with an electronic marketplace.

The user interface 412 that provides the recommended item 410 may include an image of the identified object 416 included in the recommended item 410, and detail information 418 associated with the identified object 416 included in the recommended item 410. The detail information 418 may include the dimensions determined by the infrared driven item recommendation system 408 as described above. The user interface 412 may enable a user to order 420 the identified object 416 for delivery. As described above, the user interface may be provided to a user via a native application configured to run on the user computing device 406 or another user computing device (not pictured). In an embodiment, and as well be discussed in further detail in FIG. 5, the user interface may be configured to enable a user to order a 3D manufactured item corresponding to the identified object 416. The user interface may be configured to enable a user to provide input regarding the determined dimensions for the identified object 416 and whether the image recognition techniques identified the correct item. Based on the user input, user preferences may be updated for the user providing the object 402 and maintained by the infrared driven item recommendation system 408.

Figure 5:
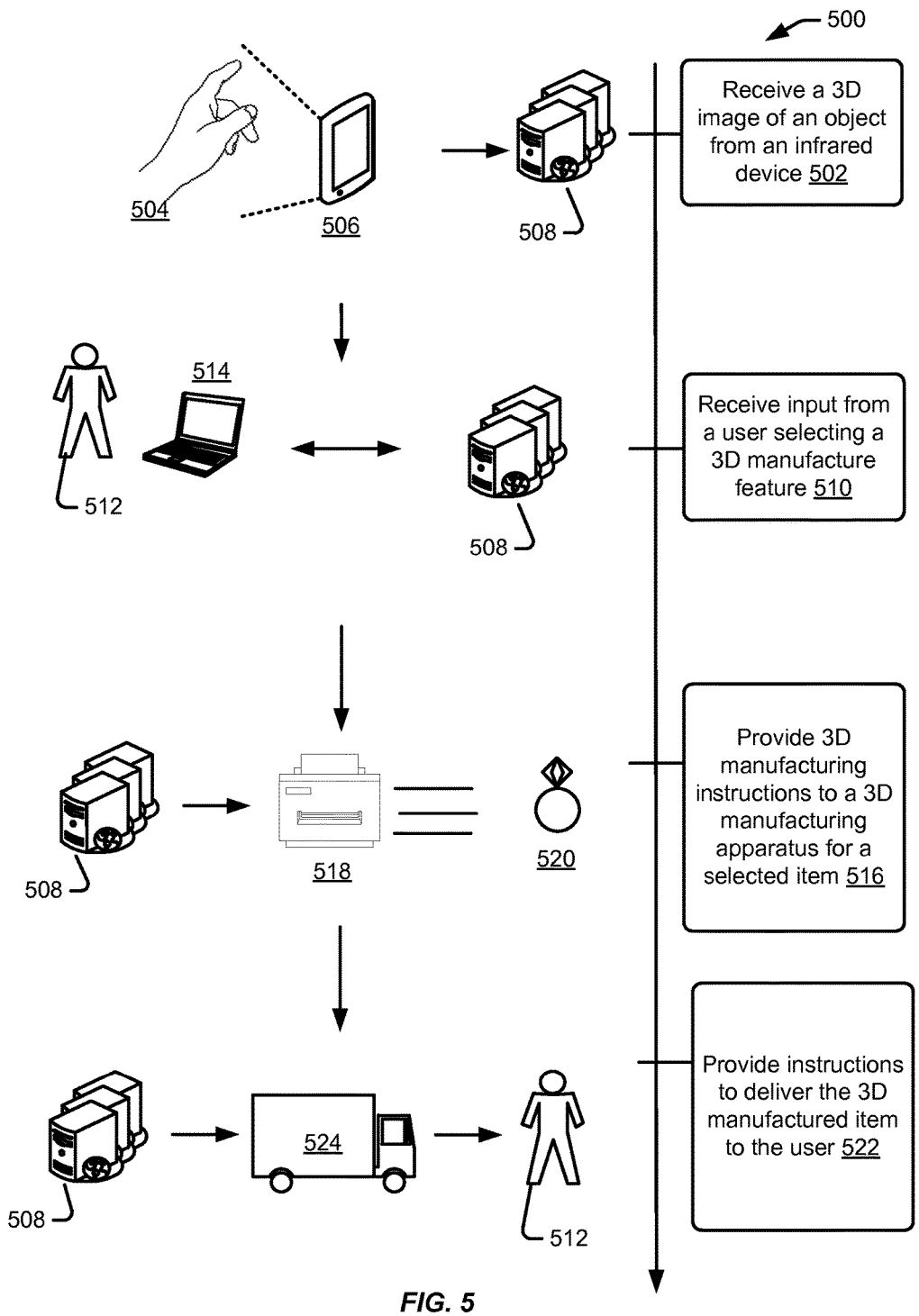
FIG. 5 is pictorial diagram depicting operation of an infrared driven item recommendation system in accordance with at least one other embodiment.

FIG. 5 is pictorial diagram depicting operation of an infrared driven item recommendation system in accordance with at least one other embodiment. The illustrative flow 500 may begin by receiving a 3D image of an object from an infrared device at 502. In an embodiment, a portion of a user 504 (a hand of the user) may be captured or scanned by an infrared device 506. The infrared device 506 may be configured to provide a 3D image of the portion of the user 504 to infrared driven item recommendation computers 508 (which may be example of the one or more service provider computers 210 of FIG. 2). The infrared driven item recommendation computers 508 may determine dimensions of the portion of the user 504 as described herein. The illustrative flow 500 may continue by receiving input from a user, via a user interface indicating a selection of a 3D manufacture feature implemented by the infrared driven item recommendation computers at 510. In embodiments, the user 512 may be provided a user interface via a user computing device 514 generated by the infrared driven item recommendation computers 508. As described herein, the user interface may include one or more items that are related to the scanned object 504 (which may include the portion of the user) and are compatible with the determined dimensions of the scanned object 504. The user interface may be configured to receive input indicating a selection of a 3D manufacture feature associated with the one or more recommended items.

The illustrative flow 500 may continue by providing 3D manufacturing instructions to a 3D manufacturing apparatus for manufacturing an item selected by the user at 516. In accordance with at least one embodiment, the infrared driven item recommendation computers 508 may be configured to generate and provide 3D manufacturing instructions to a 3D manufacturing apparatus 518. The 3D manufacturing instructions may correspond to an item included in the recommended items, as described above, and compatible with the determined dimensions for the scanned object 504. The 3D manufactured item 520 may aid the user in determining whether to purchase the actual item included in the recommended items generated by the infrared driven item recommendation computers 508 as the user can feel the fit and potentially the texture of the item as opposed to only seeing the dimensions of an object and imagining what the fit may be. The illustrative flow 500 may conclude at 522 by providing instructions to deliver the 3D manufactured item to the user. In embodiments, the infrared driven item recommendation computers 508 may provide instructions to deliver 524 the 3D manufactured item 520 to the user 512. Upon receiving the 3D manufactured item 520 the user 512 may interact with the user interface described above or another user interface to order the actual item corresponding to the 3D manufactured item 520 or provide further information to update the dimensions of the scanned object to drive further recommendations.

Figure 6:
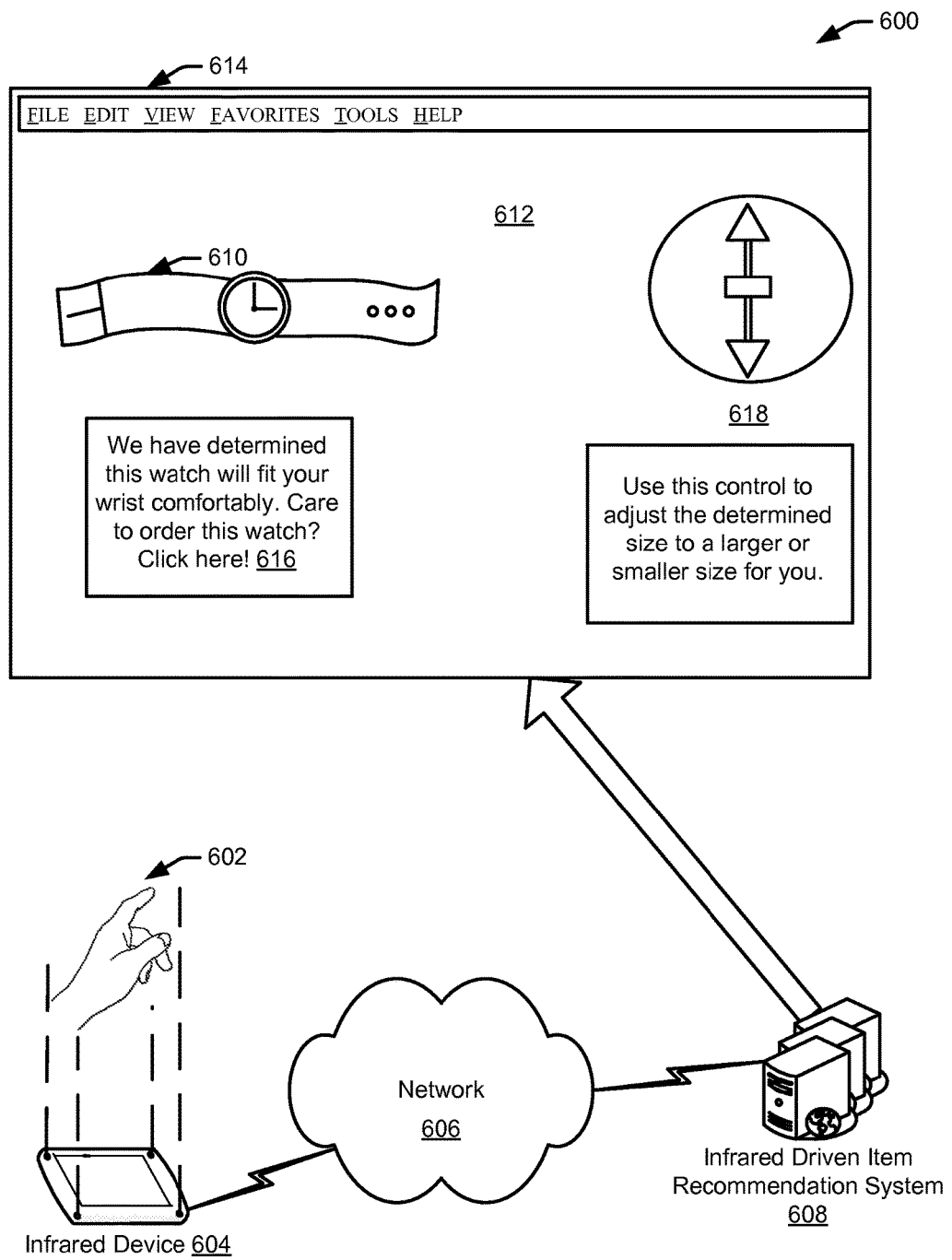
FIG. 6 is pictorial diagram depicting operation of an illustrative infrared driven item recommendation system in accordance with at least one other embodiment.

FIG. 6 is a pictorial diagram depicting operation of an illustrative infrared driven item recommendation system in accordance with at least one other embodiment. Illustrative flow 600 of FIG. 6 includes an object, such as a portion of a user 602 being scanned by an infrared device 604. In embodiments, the infrared device 604 is configured to generate a 3D image of the portion of the user 602 and provide the 3D image via one or more networks 606 to an infrared driven item recommendation system 608. The infrared device 604 may utilize a series of one or more stereoscopic cameras to capture or scan the object 602 for generating the 3D image. In accordance with at least one embodiment, the infrared driven item recommendation system 608 may utilize the 3D image to generate depth map information for the portion of the user 602. Calibration information and the generated depth map information may be utilized by the infrared driven item recommendation system 608 to determine dimensions for the portion of the user 602 such as the circumference of the wrist of the user.

In embodiments, the infrared driven item recommendation system 608 may utilize image recognition techniques and the determined dimensions of the portion of the user 602 to generate one or more recommended items for order and delivery to the user. FIG. 6 includes a recommended item 610 (a watch) that will comfortably fit the user according to the determined dimensions of the portion of the user 602. The recommended item 610 may be presented to a user via a user interface 612 displayed via an application 614 configured to run on a user computing device (not pictured). The user interface may enable a user to order 616 the recommended item 610 and to adjust the determined dimensions 618 or size of the recommend item. As described above, the user interface 612 may be configured to present an augmented reality feature including a representation of the portion of the user 602 with a representation of the recommended item 610 overlaid to provide a visual of the item and the portion of the user to check the accuracy of the determined dimensions. The augmented reality presentation, in combination with the size adjustment tool 618 may allow the user to achieve finer granulation when determining a size or dimensions of an item before ordering the item.

Figure 7:
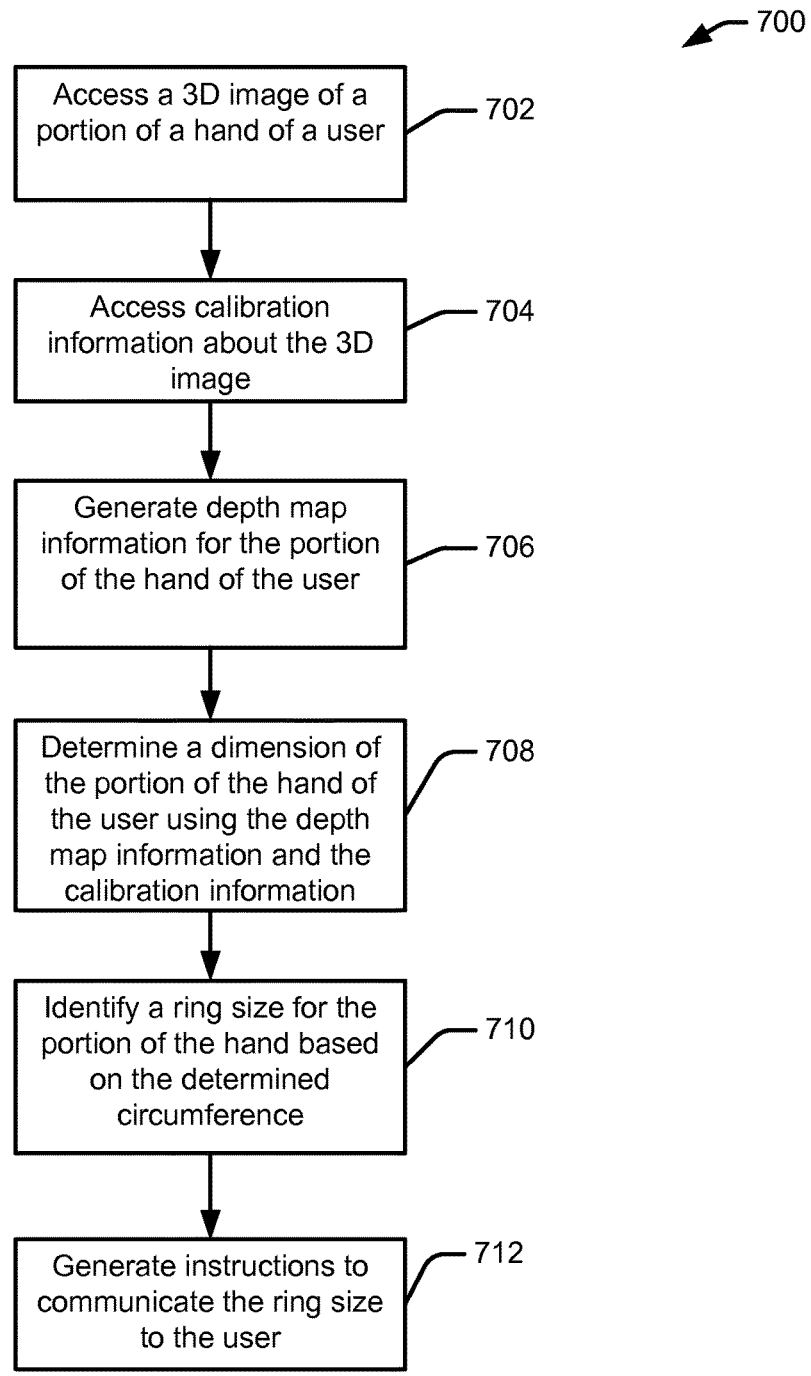
FIG. 7 is a flow diagram of an illustrative process for implementing an infrared driven item recommendation system in accordance with at least one embodiment.

FIG. 7 is a flow diagram of an illustrative process for implementing an infrared driven item recommendation system in accordance with at least one embodiment. This process is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the process (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

In some examples, the one or more service provider computers 210 (e.g., utilizing at least one of the infrared driven item recommendation module 232, the depth map module 300, the object dimension module 302, the user interface module 304, the calibration module 306, the 3D printing module 308, and the image recognition module 310 in communication with one or more data stores 312) shown in FIGS. 2 and 3, may perform the process 700 of FIG. 7. In FIG. 7 the process 700 may include accessing a 3D image of a portion of a hand of a user at 702. The 3D image may be captured by an imaging device such as infrared device as described herein. The portion of the hand of the user may include a finger of the hand of the user. The process 700 may include accessing calibration information associated with the 3D image at 704. For example, the imaging device may be configured to capture calibration information by utilizing a laser reference point, or by utilizing mathematical techniques that use a reference object included in the 3D image for determining the distance of the object included in the 3D image from the imaging device. The process 700 may include generating depth map information for the portion of the hand of the user at 706. For example, the infrared driven item recommendation module 232 may generate the depth map information utilizing the 3D image of the portion of the hand. The depth map information may include information indicating the relative position and dimensions of the object included in the 3D image. In an embodiment, the calibration information may include the distance of the portion of the hand of the user from the infrared device for use in determining measurements of the portion of the hand. For example, the depth map information may include relative position and dimension information for an object included in the 3D image and the calibration information, which may include the distance of the object from the 3D imaging device, may be utilized by the object dimension module 302 to accurately determine the dimensions of the object utilizing trigonometry, geometry, or any suitable mathematical or probabilistic techniques to determine the actual dimensions of the object included in the 3D image.

The process 700 may include determining a dimension of the portion of the hand at 708. In an embodiment, the dimension of the portion of the hand may be determined based on the depth map information and the calibration information. The dimension may include a circumference of a finger of the portion of the hand of the user. The process 700 may include identifying a ring size for the portion of the hand based on the determined circumference at 710. In an embodiment, the infrared driven item recommendation module 232 may identify one or more ring sizes corresponding to each finger and thumb included in the portion of the hand of the user. The process 700 may conclude at 712 by generating instructions to communicate the ring size to the user. In accordance with at least one embodiment, the ring size and a ring corresponding to the ring size may be provided to the user via a user interface as described herein. The user interface may be configured to allow the user to order an item that adheres to the identified ring size for delivery. In embodiments, the generated instructions to communicate the ring size to the user may be generated by the object dimension module 302 and infrared driven item recommendation module 232 for communication by the user interface module 304. The user interface module 304 may further provide the generated instructions via a number of communication channels such as a short message service (SMS) text, an email, via a native application, or any suitable digital communication channel.

Figure 8:
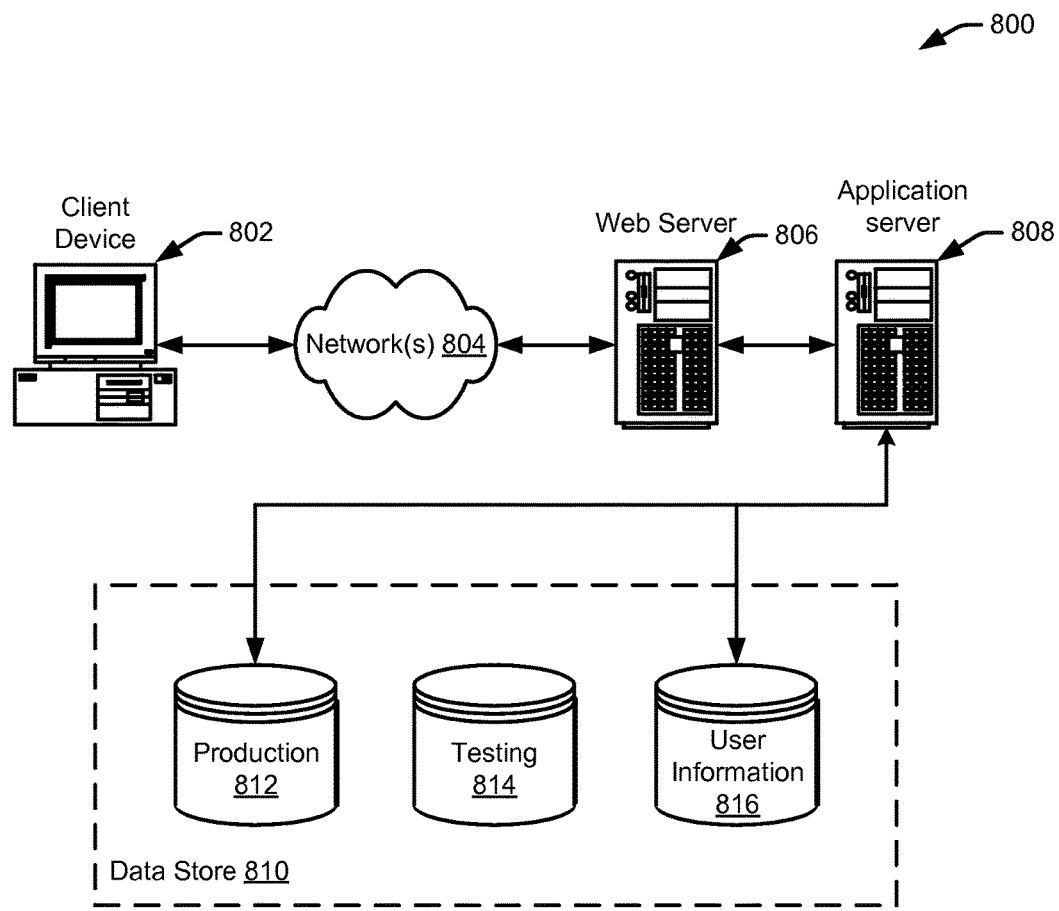
FIG. 8 illustrates a computing environment in which various embodiments can be implemented.

FIG. 8 illustrates aspects of an example computing environment 800 for implementing aspects of the present disclosure in accordance with various embodiments. As will be appreciated, although a Web-based environment is used for purposes of explanation, different environments may be used, as appropriate, to implement various embodiments. The environment includes an electronic client device 802 (which may be example of the user computing device 104 of FIG. 1), which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 (which may be example of the one or more infrared driven item recommendation computers 108 of FIG. 1 or of the one or more service provider computers 210 of FIG. 2) and a data store 810. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a network page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    accessing, by a computer system, a three dimensional (3D) image of at least a portion of a finger of a hand of a user, the 3D image captured by a 3D imaging device;
    accessing, by the computer system, calibration information associated with the 3D image, the calibration information comprising a distance of the at least a portion of the finger from the 3D imaging device;

generating, by the computer system, depth map information for the at least a portion of the finger from the 3D image;

determining by the computer system, a dimension of the finger based at least in part on the depth map information and the calibration information, wherein the dimension comprises a circumference;

updating, by the computer system, the determined dimensions of the finger based at least in part on a difference between the dimension of the finger and average dimension information derived from a plurality of users exceeding a threshold amount;

identifying, by the computer system, a ring size for the finger based at least in part on the updated dimension of the finger; and generating, by the computer system, instructions to communicate the ring size to the user.

2. The computer-implemented method of claim 1, further comprising comparing the determined dimension of the finger to a library of finger dimensions of other users to check the accuracy of the determined dimension of the finger.

3. The computer-implemented method of claim 1, further comprising storing the identified ring size and the determined dimension as a preference for the user in a data store maintained by an electronic marketplace.

4. The computer-implemented method of claim 1, further comprising:
generating a recommendation for a ring available for purchase from an electronic marketplace, and
generating instructions to communicate the recommendation to the user.

5. The computer-implemented method of claim 1, wherein the 3D imaging device comprises at least one of a stereoscopic camera, a digital camera, an infrared camera, or a device implementing range imaging techniques.

6. A non-transitory computer-readable storage medium storing computer-executable instructions that, when executed by a computer system, configure the computer system to perform operations comprising:
receiving a three dimensional (3D) image of an object from a 3D imaging device;
receiving calibration information for determining a dimension related to the 3D image, the calibration information including a distance of the object from the 3D imaging device;
determining the dimension of the object based at least in part on the 3D image of the object and the calibration information;
adjusting the dimension of the object based at least in part on a difference between an average dimension of the object and the dimension of the object exceeding a threshold amount, the average dimension of the object generated from a plurality of previously captured 3D images of similar objects; and
generating a recommendation for an item that is compatible with the object and available from an electronic marketplace based at least in part the adjusted dimension of the object, wherein the item is compatible for use with the object.

7. The non-transitory computer-readable storage medium of claim 6, the operations further comprising:
generating 3D manufacturing instructions for the item based at least in part on the adjusted dimension of the object or the determined dimension of the object; and
providing the 3D manufacturing instructions to a 3D manufacturing apparatus to manufacture the item.

8. The non-transitory computer-readable storage medium of claim 7, wherein the manufactured item is made available for order from the electronic marketplace.

9. The non-transitory computer-readable storage medium of claim 8, wherein an order for the manufactured item from the electronic marketplace includes a request to change a dimension of the manufactured item.

10. The non-transitory computer-readable storage medium of claim 6, the operations further comprising providing instructions to a user of the 3D imaging device to calibrate the 3D imaging device.

11. The non-transitory computer-readable storage medium of claim 6, the operations further comprising:
aggregating 3D images of similar objects, each 3D image including depth map information about the similar objects; and
updating the determined dimension of the object based at least in part on the aggregated 3D images of the similar objects.

12. The non-transitory computer-readable storage medium of claim 6, the operations further comprising:
adding the 3D image of the object to a library of 3D images of a plurality of objects.

13. The non-transitory computer-readable storage medium of claim 12, the operations further comprising:
identifying one or more items that are available from the electronic marketplace and are compatible with the adjusted dimensions of the object based at least in part on performance of image recognition, the image recognition utilizing 3D images of the one or more items and the 3D image of the object; and
generating another recommendation that includes the one or more items.

14. A computer system, comprising:
a processor; and
memory in communication with the processor, the memory including computer-executable instructions that, when executed by the processor, cause the system to at least:
receive a 3D image of at least a portion of a user from a device and calibration information for determining a distance of the at least a portion of the user from the device;
determine dimensions of at least the portion of the user using the 3D image and the calibration information;
update the determined dimensions of at least the portion of the user based at least in part on a difference between the determined dimensions and average dimension information derived from a plurality of users exceeding a threshold amount; and
generate a recommendation for an item based at least in part on the updated dimensions.

15. The computer system of claim 14, wherein the computer-executable instructions, when executed by the processor, cause the system to further present the user with a visual guide, displayed in a user interface, for calibrating the device, wherein the visual guide is based at least in part on an initial scan of the at least a portion of the user by the device.

16. The computer system of claim 14, wherein the computer-executable instructions, when executed by the processor, cause the system to further:
provide the recommendation to the user on a user interface of an electronic marketplace.

17. The computer system of claim 16, wherein providing the recommendation to the user includes generating an augmented reality representation of the item included in the recommendation, the augmented reality representation including a generated 3D model of the item interacting with a generated 3D model of the at least a portion of the user included in the received 3D image.

18. The computer system of claim 17, wherein the augmented reality representation is configured to enable the user to adjust the determined dimensions of the at least a portion of the user or a size of the item included in the recommendation.

19. The computer system of claim 14, wherein determining the distance between the at least a portion of the user and the device includes using at least one of a laser reference point; an object reference point; or a computer vision algorithm that utilizes background cues included in the 3D image of at least the portion of the user.

20. The computer system of claim 14, wherein the computer-executable instructions that, when executed by the processor, cause the system to further:
- analyze the received calibration information and the 3D image of the at least a portion of the user to determine image quality of the 3D image; and
- generate instructions for the user indicating that additional 3D images must be provided via the device.

\* \* \* \* \*